United States Patent Office 3,422,147
Patented Jan. 14, 1969

3,422,147
PREPARATION OF 1-OXO-1,2,3,4-TETRAHYDRONAPHTHALENE AND 1-HYDROXY-1,2,3,4-TETRAHYDRONAPHTHALENE
Donald M. Fenton, Anaheim, Calif., assignor to Union Oil Company of California, Los Angeles, Calif., a corporation of California
No Drawing. Filed Jan. 11, 1968, Ser. No. 696,986
U.S. Cl. 260—590                                7 Claims
Int. Cl. C07c 45/02

ABSTRACT OF THE DISCLOSURE

The invention relates to the preparation of 1-oxo-1,2,3,4-tetrahydronaphthalene or derivatives thereof by oxidation of 1,2,3,4-tetrahydronaphthalene or derivatives in the presence of a catalyst comprising a complex of a Group VIII noble metal with a biphyllic ligand from the group consisting of organic phosphines, organic arsines and organic stibines.

---

Oxidation of 1,2,3,4-tetrahydronaphthalene to 1-oxo-1,2,3,4-tetrahydronaphthalene with molecular oxygen has been disclosed, e.g. by Robertson and Waters, J.C.S., 1574–90 (1948). This process conventionally gives a yield of 1-oxo-1,2,3,4-tetrahydronaphthalene of about 48%, with 1-hydroxy-1,2,3,4-tetrahydronaphthalene being the other major product (usually in a yield of about 30%). The 1-oxo-1,2,3,4-tetrahydronaphthalene thus prepared is of value because it can be converted to alpha naphthol, e.g., by dehydrogenation with palladium on charcoal. Alpha naphthol is valuable for a variety of uses such as dyes, synthetic perfumes and synthesis of other organic compounds. This prior art process, however, has the disadvantage of giving a relatively low yield of 1-oxo-1,2,3,4-tetrahydronaphthalene, as mentioned above.

It has now been found that the yield of 1-oxo-1,2,3,4-tetrahydronaphthalene, as compared to 1-hydroxy-1,2,3,4-tetrahydronaphthalene, i.e., the selectivity of the reaction for 1-oxo-1,2,3,4-tetrahydronaphthalene, may be substantially improved by carrying out the reaction in the presence of a catalytic amount of a Group VIII noble metal catalyst.

Although the invention is particularly applicable to oxidation of 1,2,3,4-tetrahydronaphthalene, it may also be used for oxidation of derivatives of 1,2,3,4-tetrahydronaphthalene. Thus, the reactant may be represented by the following formula:

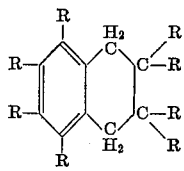

where R represents hydrogen or the same or different alkyl, aryl, alkaryl, aralkyl or cycloalkyl radicals having from 1 to about 12 carbon atoms.

The reaction is carried out in the liquid phase at a temperature of from about 50° to 150° C., preferably from about 70° to 110° C., and a pressure of from atmospheric to about 1000 p.s.i.g. Temperature and pressure should be such as to maintain the 1,2,3,4-tetrahydronaphthalene compound in the liquid state and provide a suitable reaction rate. In addition, the temperature of the reaction should be kept below about 120° C. for best yield and selectivity. Generally, atmospheric pressure gives satisfactory yields and reaction rates. Optimum values of temperature and pressure will vary according to the nature, purity and amounts of the reactants, time of reaction, etc. Time of the reaction may vary from about ½ hour to 72 hours with optimum time depending on the above-discussed variables. Separation of the 1-oxo-1,2,3,4-tetrahydronaphthalene from the reaction mixture is accomplished by conventional procedures, e.g., by fractional distillation at atmospheric or reduced pressure (see page 1577 of above-cited Robertson and Waters article), or by chemically reacting in the presence of the other reaction materials to give derivatives, such as the oxime.

Air is preferably the source of the molecular oxygen; however, pure oxygen may be used and the pressure is then kept near atmospheric. An inert carrier such as nitrogen or helium may be employed for the air or oxygen. The air or oxygen is sparged through the reaction mixture or added in increments until the desired conversion of the 1,2,3,4-tetrahydronaphthalene is achieved. Amounts of the catalyst will vary from about 0.001 to 2.0 wt. percent, based on the weight of 1,2,3,4-tetrahydronaphthalene.

Any suitable reaction vessel, such as a flask or an autoclave (for large scale reactions) having means for stirring, introduction of gases and removal of water (e.g., by means of a condenser) formed during reaction may be used for the reaction. The 1,2,3,4-tetrahydronaphthalene may be pure or may be the crude material derived from refinery operations. Generally the 1,2,3,4-tetrahydronaphthalene and catalyst are first added to the autoclave and the mixture is agitated by the addition of the oxygen-containing gas, as well as by stirring. These procedural steps may, however, be varied considerably without altering the essential steps of the process as set forth in the claims below.

The catalyst employed in the present invention comprises a complex of a Group VIII noble metal and a biphyllic ligand of phosphorus, arsenic or antimony. The Group VIII noble metal can be palladium, rhodium, ruthenium, platinum, osmium or iridium.

The biphyllic ligand consists of organic phosphines, arsines or stibines. Of these, the phosphines are preferred. Examples of suitable biphyllic ligands are: trimethyl phosphine, triethyl arsine, triisopropyl stibine, ethyldiisopropyl stibine, tricyclohexyl phosphine, triphenyl phosphine, tri-(o-tolyl)phosphine, phenyldiisopropyl phosphine, phenyl diamyl phosphine, diphenylethyl phosphine, ethylene bis-(diphenyl phosphine), hexamethylene bis(diisopropyl arsine), pentamethylene bis(diethylstibine), etc. Of the aforementioned, the aryl phosphines are preferred because of their greater activity.

The noble metal-biphyllic ligand complex can be prepared externally and introduced into the reaction medium, or the complex may be prepared in situ by addition of a suitable noble metal compound and biphyllic ligand to the reaction mixture. The Group VIII noble metal can be added to the reaction medium as a soluble salt, a carbonyl compound or chelate. Examples of suitable salts are the nitrates and halides of the metals such as rhodium chloride, palladium chloride, palladium nitrate, rhodium acetate, ruthenium bromide, osmium fluoride, ruthenium chloride, iridium chloride, etc. Examples of suitable chelates are palladium acetyl acetonate and complexes of the platinum group metal ions with such conventional chelating agents as ethylene-diamine tetraacetic acid and its alkali metal salts, citric acid, etc.

A catalytic quantity of the Group VIII noble metal-containing catalyst is used. This is generally an amount sufficient to provide a concentration of the Group VIII noble metal which is between about 0.001 and about 2.0 weight percent of the liquid reaction medium and preferably between about 0.05 and about 0.5 weight percent.

The following examples will serve to more specifically describe the invention and its advantages.

Example 1

To 400 ml. 1,2,3,4-tetrahydronaphthalene and 0.2 g. iridium dihydrochlorotristriphenylphosphine in a 1-liter three-necked flask equipped with a thermometer, mechanical stirring device, gas inlet tube and reflux condenser was added air over a 48 hour period at 90° C. with stirring. The reaction mixture was distilled to give 79 g. of product boiling at 90-110° C./2 mm. Gas chromatography showed 49 g. of 1-oxo-1,2,3,4-tetrahydronaphthalene and 25 g. of 1-hydroxy-1,2,3,4-tetrahydronaphthalene in this fraction. The total product weighed 91 g.

Example 2

To 400 ml. 1,2,3,4-tetrahydronaphthalene and 0.1 g. rhodium chlorocarbonylbistriphenylphosphine under the same conditions as Example 1 was added air for 48 hours at 90° C. There resulted 92 g. of a fraction boiling at 90-110° C./2 mm. which analyzed for 46 g. of 1-oxo-1,2,3,4-tetrahydronaphthalene and 41 g. of 1-hydroxy-1,2,3,4-tetrahydronaphthalene. The total product weighed 137 g.

Example 3

In a similar manner 400 ml. 1,2,3,4-tetrahydronaphthalene and 0.1 g. of iridium dihydrochlorotristriphenylphosphine at 85° C. gave 162 g. of product with 104 g. of a fraction boiling at 70-90° C./1 mm., $\eta_D^{25}$ 1.5630, which contained 90 g. of 1-oxo-1,2,3,4-tetrahydronaphthalene.

Example 4

In a similar manner 400 ml. of 1,2,3,4-tetrahydronaphthalene and 0.1 g. of ruthenium dichlorodicarbonyltristriphenylphosphine at 85° C. for 48 hours gave 122 g. of product with the fraction boiling at 70-90° C./1 mm. containing 61% 1-oxo-1,2,3,4-tetrahydronaphthalene.

Example 5

The results of Example 4 compare to a standard run without catalyst which gave 164 g. of product in which the percent 1-oxo-1,2,3,4-tetrahydronaphthalene was 49% and 1-hydroxy-1,2,3,4-tetrahydronaphthalene was 20%.

Example 6

To 400 ml. 1,2,3,4-tetrahydronaphthalene and 0.5 g. rhodium chlorotristriphenylphosphine in a 1-liter flask as described in Example 1 was added air for 48 hours at 80° C. There was isolated 130 g. of product of which 61 g. was 1-oxo-1,2,3,4-tetrahydronaphthalene and 34 g. was 1-hydroxy-1,2,3,4-tetrahydronaphthalene.

I claim:
1. In the method of preparing 1-oxo-1,2,3,4-tetrahydronaphthalene or derivatives thereof by oxidation of 1,2,3,4-tetrahydronaphthalene or derivatives represented by the formula

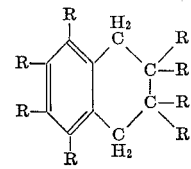

in which R is hydrogen or the same or different alkyl, aryl, alkaryl, aralkyl or cycloalkyl radicals having from 1 to about 12 carbon atoms, with molecular oxygen to form mixture of products comprising 1-oxo-1,2,3,4-tetrahydronaphthalene or derivatives and 1-hydroxy-1,2,3,4-tetrahydronaphthalene or derivatives, the improvement comprising carrying out the oxidation in the presence of a catalyst comprising a complex of a Group VIII noble metal with a biphyllic ligand from the group consisting of organic phosphines, organic arsines and organic stibines to increase the proportion of 1-oxo-1,2,3,4-tetrahydronaphthalene or derivative relative to that of 1-hydroxy-1,2,3,4-tetrahydronaphthalene or derivative in the product.

2. The method of claim 1 in which the source of the molecular oxygen is air.

3. The method of claim 1 in which the reaction temperature is from about 50° to 150° C. and the pressure is from about atmospheric to about 1000 p.s.i.g.

4. The process of claim 1 in which the Group VIII noble metal is ruthenium.

5. The process of claim 1 in which the Group VIII noble metal is iridium.

6. The process of claim 1 in which the Group VIII noble metal is rhodium.

7. The process of claim 1 in which the biphyllic ligand is triphenylphosphine.

References Cited

UNITED STATES PATENTS 1,789,924   1/1931   Binapfl.

DANIEL D. HORWITZ, *Primary Examiner.*

U.S. Cl. X.R.

260—621; 252—431